United States Patent
Engstrand

(10) Patent No.: US 6,952,009 B1
(45) Date of Patent: Oct. 4, 2005

(54) APPARATUS, A SYSTEM AND A METHOD FOR MONITORING A POSITION OF A SHAFT ELEMENT IN A CYLINDER AND AN APPARATUS, A SYSTEM AND A METHOD FOR CLEANING OF THE SHAFT ELEMENT

(75) Inventor: Bradley Engstrand, Hartford, WI (US)

(73) Assignee: Motion Controls, L.L.C., Hartford, WI (US)

( * ) Notice: Subject to any disclaimer, the term of this patent is extended or adjusted under 35 U.S.C. 154(b) by 342 days.

(21) Appl. No.: 09/690,151

(22) Filed: Oct. 17, 2000

(51) Int. Cl.$^7$ .............................................. G01D 5/34
(52) U.S. Cl. ............................ 250/231.1; 92/5 R; 91/1
(58) Field of Search ....................... 250/231.1, 227.11, 250/216, 221, 231.19; 123/193.1, 93.1; 92/5 R; 71/361, 1; 91/361, 1

(56) References Cited

U.S. PATENT DOCUMENTS

| | | | |
|---|---|---|---|
| 3,368,751 A | 2/1968 | Merrill ........................ 235/201 |
| 3,885,872 A | 5/1975 | Howe, Jr. et al. ............... 356/4 |
| 4,150,299 A | 4/1979 | Kasiewicz et al. ........... 250/561 |
| 4,501,642 A | 2/1985 | Wells .......................... 162/198 |
| 4,661,695 A | 4/1987 | Mori et al. .................. 250/227 |
| 4,736,674 A | 4/1988 | Stoll ............................... 92/5 |
| 4,806,707 A | 2/1989 | Landmeier ................... 178/18 |
| 4,902,903 A | 2/1990 | Segerson et al. ........... 250/561 |
| 4,970,361 A * | 11/1990 | Fuse ........................ 219/86.41 |
| 5,182,979 A | 2/1993 | Morgan ............................ 92/5 |
| 5,231,959 A * | 8/1993 | Smietana .................. 123/90.12 |
| 5,271,505 A * | 12/1993 | Low ............................ 209/587 |
| 5,705,742 A * | 1/1998 | Fox et al. ...................... 73/116 |
| 5,744,705 A | 4/1998 | Derouen et al. .............. 73/116 |
| 5,799,629 A * | 9/1998 | Lowi, Jr. .................... 123/56.8 |
| 5,977,778 A | 11/1999 | Chan et al. ................. 324/635 |
| 5,988,676 A * | 11/1999 | Lotito et al. ................ 280/735 |
| 6,058,776 A * | 5/2000 | Algers et al. ............. 73/304 R |
| 6,170,573 B1 * | 1/2001 | Brunet et al. ............... 166/153 |

\* cited by examiner

*Primary Examiner*—Thanh X. Luu
(74) *Attorney, Agent, or Firm*—Patents & TMS, P.C.

(57) ABSTRACT

An apparatus, a system and a method are provided for monitoring position of a machine element within a mechanical system and/or cleaning a machine element. A light source and sensor may be positioned within a cylinder. The sensor may detect the intensity of light within the cylinder as a shaft element moves laterally throughout the cylinder. The measurement may indicate the position of the shaft element within the cylinder. In addition, a seal, a wire brush and/or a bronze brush may be placed near an end wall of a cylinder. The seal may surround the shaft element. Furthermore, the shaft element may be coated with a compound, such as a nitrile compound or a ceramic compound or the like. The wire brush and bronze brush may be in contact with the shaft element and may scrape any contaminants, such as weld spatter, which may be deposited on the shaft element.

24 Claims, 1 Drawing Sheet

APPARATUS, A SYSTEM AND A METHOD FOR MONITORING A POSITION OF A SHAFT ELEMENT IN A CYLINDER AND AN APPARATUS, A SYSTEM AND A METHOD FOR CLEANING OF THE SHAFT ELEMENT

BACKGROUND OF THE INVENTION

The present invention generally relates to an apparatus, a system and a method for measuring position of a machine element and/or cleaning a machine element. More specifically, the present invention relates to an apparatus providing a sensor capable of detecting the position of a machine element within a mechanical system as well as providing a means for preventing and/or eliminating the accumulation of contaminants onto a machine element, such as a piston rod, or the like. In addition, the present invention provides a system and a method for measuring position of a machine element as well as a system and a method for prevention of contaminant accumulation onto a machine element.

It is, of course, generally known to measure position of a machine element in a mechanical system. System monitoring may lead to detection of irregularities within the system as well as an indication of the overall efficiency of the system. However, known monitoring systems generally utilize a sensor whereby contact is made between the sensor and the moving machine element. Moreover, extra components, such as sensors, attached to moving parts of a mechanical system may decrease the efficiency of the system. In addition, it is generally known to clean machine elements to prolong their period of use. Accumulation of contaminants onto machine elements can increase the wear on a machine element and decrease the period of use within a mechanical system. Furthermore, the accumulation of debris on a machine element may also decrease the efficiency of the machine element as well as the overall efficiency of the mechanical system.

A need, therefore, exists for an improved measurement device, system and method for monitoring position of a machine element within a mechanical system. Moreover, a need exists for an improved device, system, and method for preventing accumulation of contaminants onto machine elements.

SUMMARY OF THE INVENTION

The present invention provides an apparatus, system and method for monitoring position of a machine element in a mechanical system and preventing accumulation of contaminants onto a machine element, such as a piston rod.

In an embodiment of the present invention, an apparatus for measuring displacement is provided. The apparatus may have a machine element having an interior wall and an exterior wall and further having an end wall substantially enclosing the interior wall and the exterior wall. The apparatus may further have a shaft element movable within the machine element. In addition, the apparatus may have a head element attached to the shaft element adjacent to the interior wall of the machine element. The apparatus may further have a light source attached to the machine element. Lastly, the apparatus may have a sensor attached to the machine element and positioned to detect intensity of light within the machine element.

In an embodiment, the apparatus has a coating on the shaft element.

In an embodiment, the apparatus has a coating on the interior wall of the machine element.

In an embodiment, the apparatus has a seal disposed around the shaft element.

In an embodiment, the apparatus has a first brush positioned at the end wall of the machine element.

In an embodiment, the first brush is constructed from wire.

In an embodiment, the apparatus has a second brush positioned at the end wall of the machine element.

In an embodiment, the first brush is constructed from bronze.

In another embodiment of the present invention an apparatus for cleaning a machine component is provided. The apparatus has a machine element having an interior wall and an exterior wall and further having an end wall substantially enclosing the interior wall and the exterior wall. The apparatus further has a shaft element movable within the machine element. In addition, the apparatus has a head element attached to the shaft element and adjacent to the interior wall of the machine element. Lastly, the apparatus has a first brush positioned at the end wall of the machine element in contact with the shaft element.

In an embodiment, the apparatus has a seal disposed around the shaft.

In an embodiment, the apparatus has a coating on the shaft element. In an embodiment, the apparatus has a second brush positioned at the end wall of the machine element.

In an embodiment, the apparatus has a light source attached to the machine element.

In another embodiment of the present invention, a method for measuring displacement of a machine element is provided, the method has the step of providing a machine element having an interior and an exterior wall and further having an end wall. The method further has the step of providing a shaft element capable of movement within the machine element. In addition, the method has the step of attaching a head element to the shaft element. The method further has the step of positioning the head element adjacent to the interior wall of the machine element. Also, the method has the step of attaching a light source to the machine element. The method further has the step of attaching a sensor to the machine element. Lastly, the method has the step of measuring intensity of light within the machine element from reflected light detected by the sensor.

In an embodiment, the method further has the steps of moving the shaft element and producing an output signal as the shaft element moves within the machine element.

In an embodiment, the method further has the steps of providing a processing unit that receives the output signal and displaying the output signal.

In an embodiment, the method further has the step of positioning a seal at the end wall of the machine element.

In an embodiment, the method further has the step of attaching a first brush to the machine element.

In an embodiment, the method further has the step of attaching a second brush to the machine element.

It is, therefore, an advantage of the present invention to provide an apparatus, a system and a method for measuring the position of a machine element within a mechanical system, such as a pneumatic or hydraulic cylinder or the like, without contacting the moving machine element.

Another advantage of the present invention is to provide an apparatus, a system and a method for measuring the position of a machine element within a mechanical system, that does not affect the motion of a machine element within a mechanical system.

Yet another advantage of the present invention is to provide an apparatus, a system and a method for measuring the position of a machine element within a mechanical system to allow detection of irregularities within the system.

Still another advantage of the present invention is to provide an apparatus, a system and a method for measuring the position of a machine element within a mechanical system to provide an indication of the overall efficiency of the mechanical system.

Another advantage of the present invention is to provide an apparatus, a system and a method for cleaning a machine element.

Still another advantage of the present invention is to provide an apparatus, a system and a method for cleaning a machine element allowing for a longer period of use of the machine element.

Yet another advantage of the present invention is to provide an apparatus, a system and a method for cleaning a machine element that provides increased efficiency of the machine element.

Another advantage of the present invention is to provide an apparatus, a system and a method for cleaning a machine element that provides increased overall efficiency of a mechanical system.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to an apparatus, a system and a method for measuring position of a machine element and/or cleaning of a machine element, such as a piston rod or the like.

Figure 1:
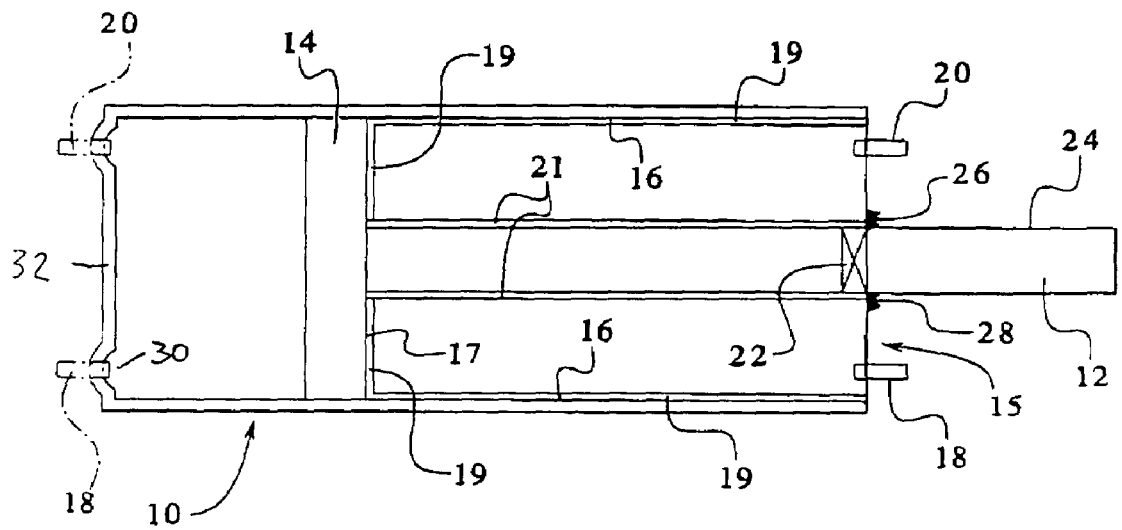
FIG. 1 illustrates a cross-sectional view of a cylinder showing sensor placement and cleaning elements of an embodiment of the present invention.

Referring now to the drawings wherein like numerals refer to like parts, FIG. 1 illustrates a cylinder machine element 10 having a shaft element 12 and a head 14 that operates cooperatively with the cylinder 10 in a manner well-known to one of ordinary skill in the art. The cylinder 10 may preferably be hydraulic or pneumatic. The cylinder 10 may also be any other type of cylinder known to one of ordinary skill in the art.

The cylinder 10 further may have an end wall 15 that may be perpendicular to the shaft 12 and that may substantially enclose the cylinder 10. The end wall 15 may surround the shaft 12. A light source 18 may be positioned on the end wall 15 of the cylinder 10 with the light from the light source 18 projecting into the interior of the cylinder 10. The light source 18 may be an LED light source or any other light source known by those skilled in the art. In addition, a light sensor 20 may also be placed on the end wall 15 of the cylinder 10 with the detecting portion of the sensor 20 directed towards the interior of the cylinder 10. The light sensor 20 measures the intensity of light within the cylinder 10 emitted by the light source 18 into the interior of the cylinder 10.

The cylinder 10 has an interior surface 16. The interior surface 16 may be coated with a substance 19 that may absorb a portion of the light emitted from the light source 18. The light absorbing coating 19 may be an anodizing compound. The surface 17 of the head 14 may also be coated with the light absorbing substance 19 or may be covered with a nitrile compound or other coating known by those skilled in the art to be light absorbing. Furthermore, the surface 24 of the shaft 12 may also be coated with a light absorbing substance 21 such as a nitrile compound, ceramic compound, or any other compound known by those skilled in the art to be coated onto a shaft that may also provide light absorbing and contaminant preventative properties. The coatings 19, 21 may have various colors that may affect and/or control the amount of light absorption.

As the head 14 and the shaft 12 transpose through the cylinder 10, a portion of the light emitted from the light source 18 may be absorbed by the coating 19 on the interior surface 16. A portion of the light emitted by the light source 18 may also be absorbed by the coating 19, 21 on the head surface 17. Lastly, a portion of the light emitted by the light source 18 may be absorbed by the coating 21 on the shaft surface 24. The light sensor 20 measures the intensity of light within the interior of the cylinder 10 that is not absorbed by the coatings 19, 21. The light sensor 20 may then transmit a signal indicative of the intensity to a processor 104, represented in FIG. 2. The processor 104 may be programmed to translate the measured intensity of the light emitted by the light source 18 that is within the cylinder 10 into a position measurement of the head 14 or shaft 12 within the cylinder 10.

In an alternate embodiment of the present invention, the cylinder 10 may have a groove 30 within an interior of an opposing end wall 32. Located within the groove 30 may be an additional light source 18 and/or an additional sensor 20. An advantage of placing the additional light source 18 and the additional sensor 20 within the groove may be to prevent the shaft element 12 and the head 14 from closing off the light path as the shaft element 12 and the head 14 move throughout the cylinder. A further advantage of placing the additional light source 18 and the additional sensor 20 within the opposing end wall 32 may be to obtain an average of two sensor readings which may provide greater accuracy in position measurement. In addition, the groove 30 may also be placed within the end wall 15 with the light source 18 and the sensor 20 placed within the groove 30.

Figure 2:
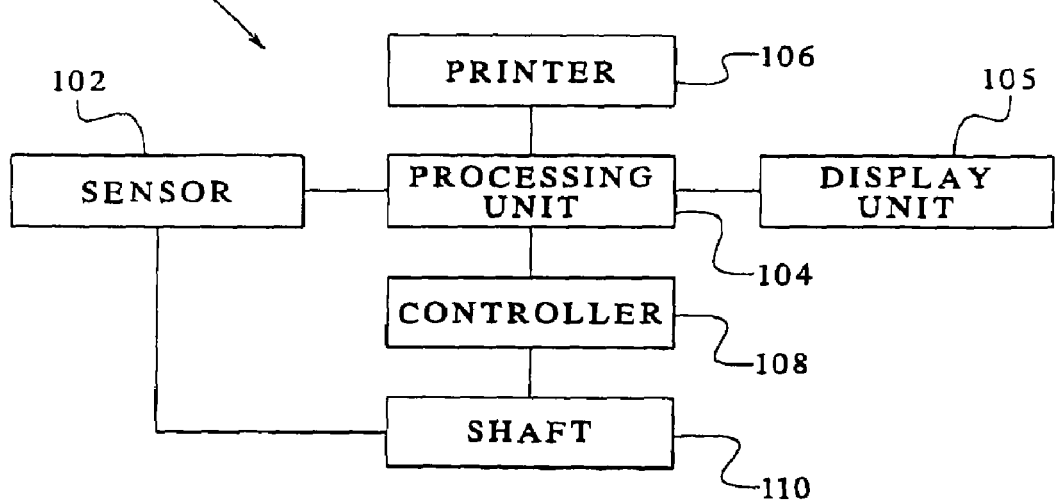
FIG. 2 illustrates a black box diagram of an embodiment of the system of the present invention.

FIG. 2 illustrates, in a black box diagram, an embodiment of a system 100 of the present invention. The system 100 includes a sensor 102 which may detect the intensity of light emitted by the light source 18 within the interior of the cylinder 10 that is not absorbed by the coatings 19, 21, within the system 100. An output signal from the sensor 102 may be transmitted to the processor 104 for signal interpretation and/or processing. The processor 104 may determine the position of the shaft 12 or head 14 within the cylinder 10.

A display unit 105 may be provided to display the absolute or relative position of the sensed shaft 12. A printer 106 may also be provided to print the results of the absolute or relative position of the shaft 12.

The processor 104 may be connected to a controller 108. After the output signal of the sensor 102 is processed by the processor 104, a signal may be transmitted to the controller 108. The controller 108 may then adjust the position of a machine element 110, such as a valve, which may affect the movement of the shaft 12 within the cylinder 10. The new position of the shaft 12 may provide the sensor 102 with a subsequent measurement which may eventually be processed by the processor 104 and may determine whether the machine element 110 may be adjusted to affect the position of the shaft 12 within the cylinder 10.

FIG. 1 also illustrates a seal 22 which may be engaged onto the shaft 12. The seal 22 may be positioned near the end wall 15 of the cylinder 10. The seal 22 may be made from, for example, rubber. A first brush 26 may be positioned near the end wall 15 of the cylinder 10 as illustrated in FIG. 1. The first brush 26 may be a wire brush, preferably made from, for example, steel or any other metal or other material known by one of ordinary skill in the art. A second brush 28 may also be positioned near the end wall 15 of the cylinder 10 diametrically opposed to the first brush 26. The second brush may be made from, for example, bronze or any other metal or other material known by one of ordinary skill in the art.

The first brush 26 and the second brush 28 may be in contact with the surface 24 of the shaft 12. As the shaft 12 moves laterally through the cylinder 10, the first brush 26 and the second brush 28 may scrape contaminants, such as weld spatter, which may be deposited onto the surface 24 of the shaft 12. By scraping contaminants from the shaft 12, the first brush 26 and the second brush 28 allow the shaft 12 to move more efficiently through the cylinder, thus providing more accurate position measurements. The coating 21 on the surface 24 of the shaft 12 may be a nitrile coating, a ceramic coating or any other coating known by those skilled in the art capable of light absorption and also capable of preventing and/or reducing the accumulation of contaminants onto a surface 24 of the shaft 12.

The various embodiments of the present invention may be operated by any power supply known by those skilled in the art. In addition, the various embodiments may be operated in remote locations through the use of a small electric generator, from a pressurized air line, or the like.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An apparatus for measuring displacement, the apparatus comprising:
   a machine element having a body defining an interior wherein the body has an interior surface and a length defined between a first end and a second end wherein the interior surface has a light-absorbing coating;
   a first wall at the first end wherein the first wall is planar and further wherein the first wall abuts the body of the machine element;
   a second wall at the second end substantially enclosing the interior;
   a shaft element movable within the machine element;
   a head element attached to the shaft element adjacent to the interior surface of the machine element;
   a light source on the first wall of the machine element wherein the light source extends inward with respect to the interior of the machine element wherein the light source emits a light into the interior of the machine element; and
   a sensor positioned on the first wall of the machine element wherein the sensor detects intensity of emitted light within the interior of the machine element which is not absorbed by the coating on the interior surface of the machine element wherein the intensity of light corresponds to a position of the head element within the machine element at a point between the first end and the second end.

2. The apparatus of claim 1 further comprising:
   a coating on the shaft element.

3. The apparatus of claim 1 wherein the light-absorbing coating is an anodizing compound.

4. The apparatus of claim 1 further comprising:
   a seal disposed around the shaft element.

5. The apparatus of claim 1 further comprising:
   a second sensor attached to the second wall.

6. The apparatus of claim 1 further comprising:
   a first brush positioned at the first wall or the second wall of the machine element.

7. The apparatus of claim 6 wherein the first brush is constructed from wire.

8. The apparatus of claim 1 further comprising:
   a second light source attached to the machine element at the second wall of the machine element.

9. The apparatus of claim 1 wherein the first wall is parallel to the second wall.

10. The apparatus of claim 1 further comprising:
    a coating on the head element.

11. An apparatus for cleaning a machine component, the apparatus comprising:
    a machine element having a body defining an interior wherein the body has an interior surface which is interior to the machine element wherein the interior surface has a light-absorbing coating and further wherein the body has a length defined between a first end and a second end wherein the first end has a wall having an opening and further wherein the wall has an exterior surface which is exterior to the machine element;
    a shaft element which is moved within the machine element wherein the shaft element extends through the opening in the wall;
    a head element within the interior of the machine element wherein the head element is attached to the shaft element; and
    a first brush positioned on the exterior surface of the wall wherein the first brush is exterior to the machine element and contacts the shaft element.

12. The apparatus of claim 11 further comprising:
    a seal disposed around the shaft.

13. The apparatus of claim 11 further comprising:
    a coating on the shaft element.

14. The apparatus of claim 11 further comprising:
    a second brush positioned on the exterior surface of the wall.

15. The apparatus of claim 11 further comprising:
    a light source attached to the machine element.

16. The apparatus of claim 11 further comprising:
    a sensor positioned to receive reflected light within the machine element.

17. A method for measuring displacement of a machine element, the method comprising the steps of:
    providing a machine element having a body defining an interior wherein the body has an interior surface and a length defined between a first wall and a second wall wherein the interior surface has a light-absorbing coating;
    providing a shaft element which moves within the machine element;
    attaching a head element to the shaft element wherein the head element moves towards the first wall while simultaneously moving away from the second wall;

positioning the head element adjacent to the interior surface of the machine element;

attaching a light source to the machine element at the first wall wherein the light source emits light into the interior of the machine element wherein the first wall is planar;

attaching a sensor to the machine element at the first wall wherein the shaft element is located between the sensor and the light source; and measuring intensity of emitted light which is not absorbed by the coating on the interior surface of the machine element wherein the intensity of emitted light is detected by the sensor.

18. The method of claim 17 further comprising the steps of:

moving the shaft element; and producing an output signal as the shaft element moves within the machine element.

19. The method of claim 18 further comprising the steps of:

providing a processing unit that receives the output signal; and displaying the output signal.

20. The method of claim 17 further comprising the step of: positioning a seal within the machine element.

21. The method of claim 17 further comprising the step of: attaching a first brush to the machine element.

22. The method of claim 21 further comprising the step of: attaching a second brush to the machine element.

23. An apparatus for measuring displacement, the apparatus comprising:

a machine element having a body defining an interior wherein the body has an interior surface and a length defined between a first end and a second end wherein the interior surface has a light-absorbing coating;

a first wall at the first end;

a second wall at the second end substantially enclosing the interior;

a shaft element movable within the machine element;

a head element attached to the shaft element adjacent to the interior surface of the machine element;

a light source on the first wall of the machine element wherein the light source emits a light into the machine element;

a sensor positioned to detect intensity of emitted light within the machine element which is not absorbed by the coating on the interior surface of the machine element wherein the intensity of light corresponds to a position of the head element within the machine element at any point between the first end and the second end; and a first brush positioned at the second wall of the machine element.

24. The apparatus of claim 23 wherein the first brush is constructed from wire.

* * * * *